United States Patent [19]

Johansson

[11] Patent Number: 5,150,114

[45] Date of Patent: Sep. 22, 1992

[54] POLLING-TYPE INFORMATION TRANSMISSION SYSTEM

[75] Inventor: Stig R. Johansson, Järfälla, Sweden

[73] Assignee: U.S. Philips Corporation, New York, N.Y.

[21] Appl. No.: 609,968

[22] Filed: Nov. 6, 1990

[30] Foreign Application Priority Data

Nov. 10, 1989 [SE] Sweden ............................ 8903775

[51] Int. Cl.$^5$ .......................................... H04Q 1/00
[52] U.S. Cl. ......................... 340/825.54; 340/825.08; 340/825.52; 340/870.03; 370/85.8
[58] Field of Search .................. 340/825.54, 825.44, 340/870.03, 825.07, 825.08, 825.52, 825.02; 370/92.5, 85.8

[56] References Cited

U.S. PATENT DOCUMENTS

| | | | |
|---|---|---|---|
| 4,071,908 | 1/1978 | Brophy et al. | 340/825.02 |
| 4,149,144 | 4/1979 | Diefenderfer | 370/85.8 |
| 4,595,921 | 6/1986 | Wang | 340/825.08 |
| 4,604,618 | 8/1986 | Akiba et al. | 340/825.54 |
| 4,667,193 | 5/1987 | Cotie et al. | 340/825.08 |
| 4,940,974 | 7/1990 | Sojka | 340/825.08 |

Primary Examiner—Donald J. Yusko
Assistant Examiner—Brian Zimmerman
Attorney, Agent, or Firm—David R. Treacy

[57] ABSTRACT

A transmission system comprising an interrogator (1) and a number of transponders (2). The transponders (2) communicate with the interrogator (1) by means of individual addresses for reading and/or writing of information in the transponders, which admits more than one transponder to be located within the read/write zone of the interrogator. By transmitting the start code from the interrogator and giving the transponders opportunity to answer with an address dependent time delay of the reply code and investigating time differences between transmitted and received reply codes in the interrogator, the address of the transponder is determined. The transmission system is suitable for use in connection with identification, for example, personal identification.

4 Claims, 2 Drawing Sheets

POLLING-TYPE INFORMATION TRANSMISSION SYSTEM

FIELD OF THE INVENTION

The invention relates to a polling-type information transmission system comprising an interrogator and a number of transponders. By means of individual addressing, transponders may communicate with the interrogator one at a time for reading and/or writing of information in the transponder even when more than one transponder is within the read/write (communications) zone of the interrogator (hereinafter referred to as being "within range" of the interrogator).

BACKGROUND OF THE INVENTION

Polling-type transmission systems are used in many situations when some kind of identification is desired. Escort memory systems in material handling and production, container and vehicle identification, identification of objects when sorting etc may be mentioned as examples. Another example is personal identification, for example, with the aim to give admittance to a department, having restrictions on the right to enter, only to persons with authority, and at the same time to obtain a registration of everyone entering.

Some of today's transmission systems operate in such a way that the interrogator activates the transponder, and the transponder then starts transmitting information to the interrogator. If there are more than one transponder within range for reading and writing, respectively, problems arise. One possible situation is that the signal from one of the transponders dominates over the other, and the interrogator may interpret the dominating signal only. Information signal from the rest of the transponders fail to be received. Another possible course is that the transponders within range of the interrogator disturb each other, so that no reading occurs. As a result none of the information from the transponders within range is received.

One solution to the problems described above is to give the transponders individual addresses, and to selectively address the transponders. The number of addresses must be limited so that the successive addressing of the transponders do not last too long. In systems with many transponders it may be necessary to assign the same address to more than one transponder. There is a risk that more than one transponder having the same address will be present within range of the interrogator, and similarly to the situation described above with more than one transponder within range of the interrogator, information from some transponders fails to be received.

SUMMARY OF THE INVENTION

It is an object of the present invention to provide a polling-type information transmission system which in a reliable and rapid way may take care of a very great number of transponders, even when more than one transponder is within the read/write zone of the interrogator at the same time.

The object of the invention is achieved by a transmission system characterized in that, for addressing of a transponder, a transmitter/receiver unit of the interrogator is arranged to transmit a start code, transponders which may come within range are arranged to transmit a reply code having a time delay dependent on the address of the transponder, in reply to a detected start code. The interrogator measures the time delay of received reply codes, and then determines the addresses for the transponders whose reply has been received. When a transponder in question has been addressed, information transmission may take place between the addressed transponder and the interrogator. By using a start code and time delayed reply codes, information is rapidly obtained about the addresses which the transponders within the read/write zone have. It is then sufficient to individually address these transponders for information transmission between the addressed transponders and the interrogator.

It is desirable that the time delay between the individual time delayed reply codes is as small as possible to make the transmission system work rapidly. However, this may cause the interrogator to receive new reply codes before the complete preceeding codes have been received. Such a situation arises in the case that the time delay between the start of each of two reply codes replying to the start code is less than or equal to the duration of the reply codes. Thus a continuous reply code may be received for a period equal to or longer than the duration of one reply code. The duration is to an essential extent dependent on the character length of the reply code. In the discussion above no attention is paid to time delays caused by the distances between the interrogator and the transponders, due to the fact that these time delays may be negligible in comparison with the differences between time delays of the reply codes in the applications for which a transmission system according to the invention may be considered.

In a preferred embodiment of the invention collisions between reply codes do not prevent reception of the reply from one or more transponders. In this embodiment the interrogator is arranged to determine the addresses of the transponders based on both the measured time delay of the received reply codes and the measured continous length of the received reply codes. From the measured continous length of the received reply codes the interrrogation determines the size of the address regions within which the address for replying transponders is located (i.e., the number of addresses having consecutive values of nominal time delay which contributed to the long reply signal). From the measured time delay to the beginning of the long reply code the interrogator determines the addresses of the respective transponders. Then the individual transponders which contributed to the long code are addressed for information transmission. In the case of colliding reply codes all transponders are successively addressed which might have transmitted a reply code during the collison. This prevents omission of any one of the transponders. Addressed transponders having a time delay not corresponding to the time within the long reply code are considered as transponders not within the range of the interrogator.

The transmission system according to the invention is very suitable for personal identification and sorting, but gives advantages in all applications in which a number of transponders may be reached from the interrogator. In the case of personal identification it is often concerned with a great number of persons and it is essential that all are registered. The fact that several persons may arrive at the check point in groups is no obstacle because the transmission system can handle several transponders within range of the interrogator.

BRIEF DESCRIPTION OF THE DRAWING

The invention will below be described in more detail with reference to the accompanying drawings, in which.

DESCRIPTION OF A PREFERRED EMBODIMENT OF A TRANSMISSION SYSTEM

Figure 1:
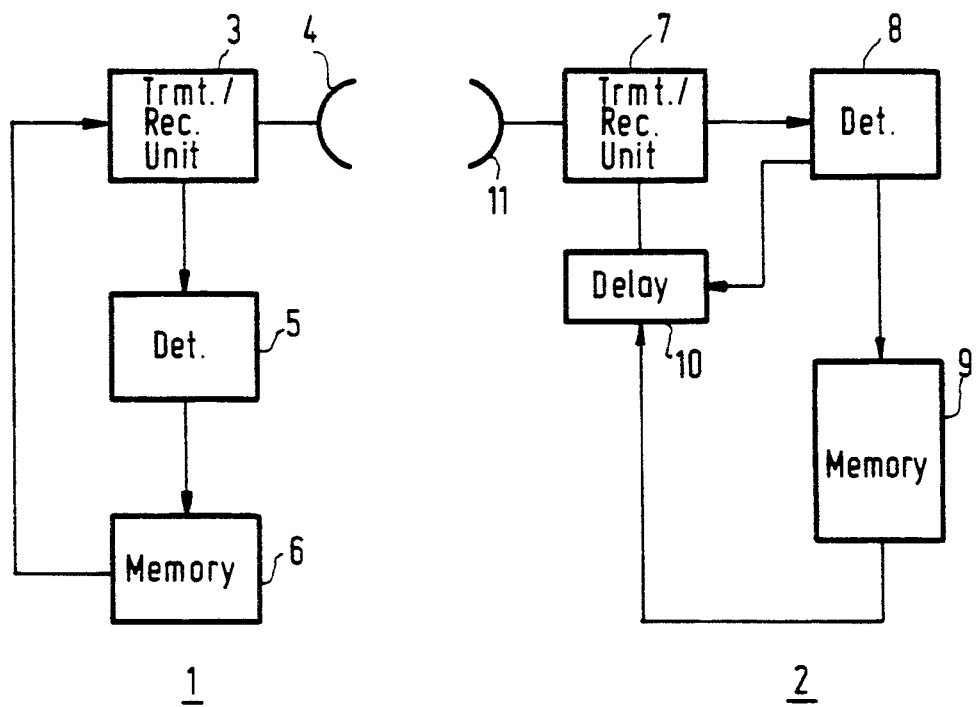
FIG. 1 is a block diagram of an interrogator and a transponder according to the invention.

FIG. 1 shows a polling transmission system according to the invention. In the system an interrogator 1 and a number of transponders, of which one transponder 2 is shown, are included. The interrogator 1 comprises a transmitter/receiver unit 3 for transmitting and/or receiving information of different kinds, such as codes, addresses and information messages. The information is modulated in a suitable known way (this will not be described in more detail since it is within the general knowledge of a person skilled in the art). The interrogator 1 comprises furthermore a transmitter/receiver antenna 4, a reply detector 5 and a memory 6. The shown transponder 2 comprises a transmitter/receiver unit 7, a start code detector 8, a memory 9, a delay unit 10 and an antenna 11.

In the transmission system each transponder is assigned a unique address number within the series of numbers (integers) 0 to n, in which n is the number of transponders in the system or a greater number. Communication between the interrogator 1 and the transponders is started by a transmission of a start code from the interrogater. In the shown embodiment the start code is stored in the memory 6 from which it is fetched for transmitting on the antenna 4 in by modulating the transmitter of the transmitter/receiver unit 3

A transponder 2 within range of the interrogator 1 receives the start code transmitted by the interrogator 1 on the transponder antenna 11. When the start code detector 8 detects the received start code, a process is started in the transponder to transmit a reply code. According to the shown embodiment the reply code is fetched from the memory 9 in order to then be delayed in a delay unit 10 to an extent dependent on the address assigned to the transponder. Furthermore an additional fixed delay may be introduced. The delayed reply code is transmitted by the transmitter/receiver unit 7 and on the antenna 11.

Reply codes transmitted by the transponders are detected by the interrogator reply detector 5. The detector 5 determines the reply time delay, that is the elapsed time from the transmitting of a start code to a receiving of a reply code in the interrogator, and the reply length, that is the length of the received reply. From this information about the reply time delay it is possible to determine the address of the transponder transmitting a reply code, in the memory means. From the reply length information it is determined if there are more than one colliding reply code, or one separate reply code in question. When reply codes are colliding, the reply length furthermore indicates the number spread between the first and last of the transponders which are colliding reply codes.

It is assumed that the interrogator knows the reply length of the transmitted reply codes, and a reply having a higher length accordingly indicates that two or several reply codes are colliding. From the address and reply code information stored in the memory 6, it can be determined which transponders contributed to the collision. When the reply time has elapsed for all possible addresses in the transmission system, the interrogator starts to address the transponders. For an unambiguously received reply code, that is non-colliding reply codes, the address for replying transponders is fetched directly from the memory 6 for transmission. When the transponder has been addressed the rest of the information transmission may take place between the addressed transponder and the interrogator.

For address regions (consecutive numbers within the series 0 to n) with colliding reply codes, the interrogator addresses each address within the address region in turn. The addresses may, as in the case of non-colliding reply codes, be fetched from the memory means. Failure to receive a reply from an addressed transponder is interpreted to mean that no transponder with that address is present within the read/write zone of the interrogator. Commonly there are quite a few non-replying addresses, and the total addressing time is thereby hardly affected. The successive addressing of the transponders carried out by the interrogator1 establishes a nondisturbed communication with each transponder within the range of the interrogator. In the transmission system a great number of transponders may be given individual addresses at the same time, as the communication time will be reasonably low and dependent on the number of transponders in the system within range of the interrogator.

Figure 2:
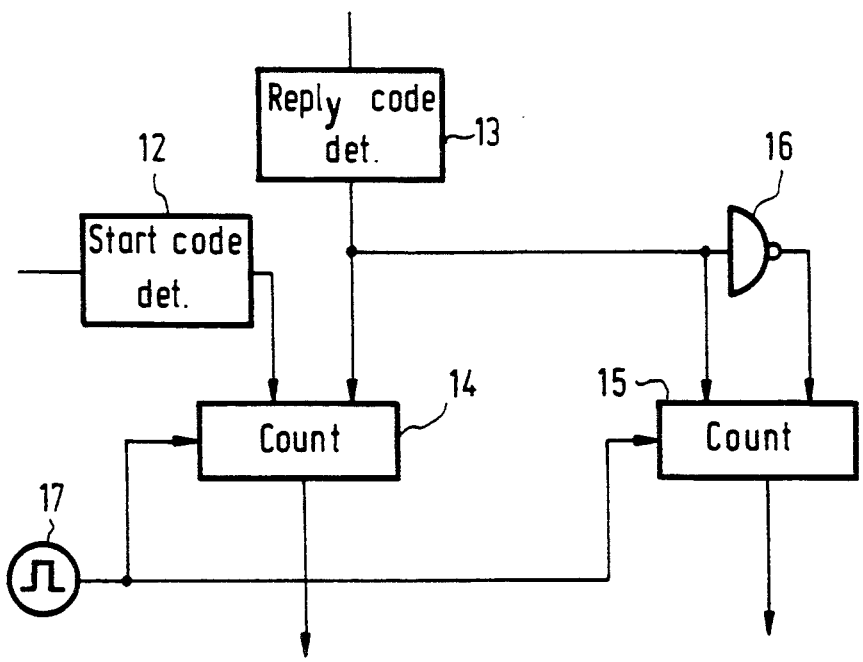
FIG. 2 is a block diagram in more detail showing a reply detector included in the interrogator according to FIG. 1.

The reply detector 5 according to FIG. 1 will now be described with reference to FIG. 2. In the detector 5 a start code detector 12 is included for detecting when a start code fetched from the memory means is transmitted by the transmitter/receiver unit. The start code detector 12 starts a counter 14 when the start code is transmitted. The counter is advanced by a clock pulse generator 17. A reply code detector 13 detects the reply codes emitted by the transponders, and causes reading of the counter 14 upon detecting these reply codes. With the value read from the counter 14 as an input signal to the memory 6 the address of the transponder in question is obtained from this memory. The reply code detector also starts a counter 15, which likewise is advanced by the clock pulse generator 17. The counter 15 is stopped, read and reset when the reply code detector 13 no longer detects any reply code transmission, by means of an inverter 16 coupled between the reply code detector 13 and the counter 15. The counter result stated by the counter 15 contains information about the size of the address region within which the transponders replying to the reply code are situated; and the counter result is used to indicate the number of consecutive reply station addresses to be fetched in the memory means 6 for transmitting.

Figure 3:
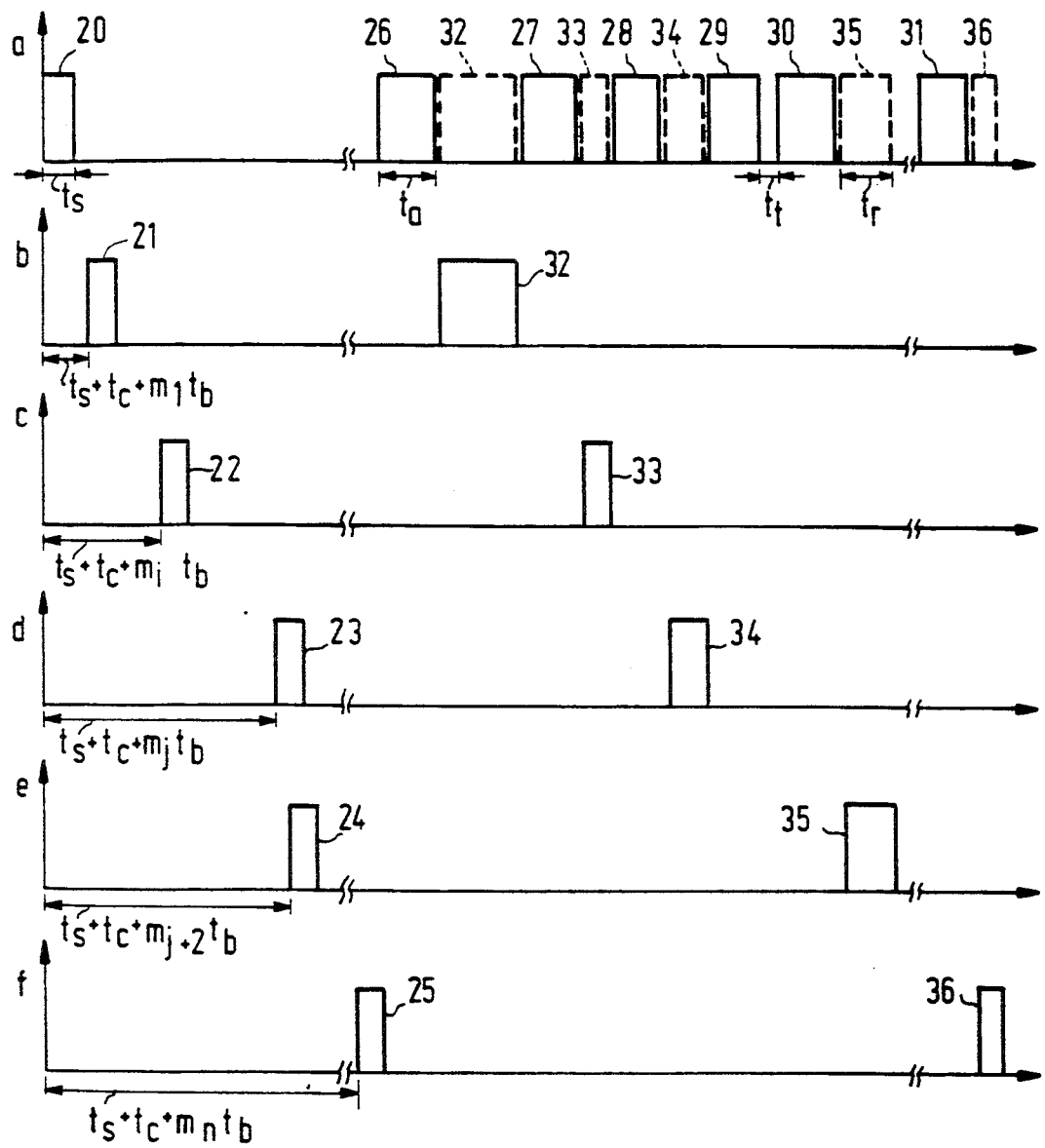
FIG. 3 shows a time diagram for an interrogator, line a, and for five different transponders, lines b-f.

In FIG. 3a a time diagram is shown for an interrogator, line a, and for five different transponders, lines b-f. In the example to be described it has been assumed that these five transponders and no other are within the range of the interrogator at the described moment. The five transponders are identified below as b-f in correspondence with the letter notation in FIG. 3. At the point of time 0 the interrogator transmits a start code 20 with a duration $t_s$. The transponder b replies to the start code 20 by generating an address dependent reply code 21. The reply code is transmitted with a time delay $t_1 = t_c + m_1 t_b$, in which $t_c$ is a fixed delay; $m_1$ is the address for the transponder 2b, and $t_b$ is the time duration of one step or increment of reply time delay, and may be the time to transfer a data or address bit in the system. The transponder c replies to the start code 20 by transmitting an address dependent reply code 22 which is delayed $t_i = t_c + m_i t_b$, in which $m_i$ is the address for the transponder c. The transponder d replies to the start code by the transmitting an address dependent reply code 23 which is delayed $t_j = t_c + m_j t_b$, in which $m_j$ is the address for the transmitter d. The transmitter e replies to the start code by transmitting an address dependent reply code 24 which is delayed $t_{j+2} = t_c + m_{j+2} t_b$, in which $m_{j+2}$ is the address for the transponder e. The transponder f replies to the start code 20 by transmitting an address dependent reply code 25 which is delayed $t_n = t_c + m_n t_b$, in which $m_n$ is the address for the transponder f.

From the shown time diagrams it is apparent that the reply codes 23 and 24 collide, because the duration of the reply codes is greater than $t_b$; while the rest of the reply codes unambigously may be used for determination of the respective addresses of the transponders. The reply stations d and e with colliding reply codes 23 and 24 are regarded as belonging to the same address region. When the reply time for all transponders has elapsed, that is when the transponder with the address $m_n$ has had opportunity to transmit its reply code, the interrogator starts to address the transponders having transmitted reply codes. A first addressing 26 having a duration $t_a$ addresses the transponder b. The addressing 26 is followed by an information transmission 32 between the transponder b and the interrogator. A second addressing 27 starts an information transmission 33 between the transponder c and the interrogator. A third addressing 28 starts an information transmission 34 between the transponder d and the interrogator. A fourth addressing 29 does not start any information transmission. The transponder addressed is not situated within the read/write zone range of the interrogator, but belongs to an address region common to the transponders d and e. When a period of time $t_t$ has elapsed and the interrogator has not received a response to the addressing 29, a fifth addressing 30 starts information transmission 35 between the transponder e and the interrogator. A sixth addressing 31 starts information transmission 36 between the transponder f and the interrogator. In the shown time diagrams the duration $t_r$ for the information transmission between the transponder and the interrogator is determined by the amount of information to be transferred. For the numerical example shown below $t_r$ however has been assumed to be a constant, which does not influence the principle discussion and furthermore is a common situation.

EXAMPLE

In a transmission system with only one transponder within the write/read zone of the interrogator the communication time $t_k$ is essentially determined by the following expression:

$$T_k = t_s + t_c + n t_b + t_a + t_r + t_{k1}$$

in which in accordance with the above
$t_s$ is the duration of the start code,
$t_c$ is a fixed delay of the reply codes of the transponders,
n is the number of addresses used in the system,
$t_b$ is the duration to count up the reply time delay with one step and may be the duration of the transmission of a data or addressbit in the system,
$t_a$ is the duration for an address code,
$t_r$ is the duration for the information transmission between the transponder and the interrogator,
$t_{k1}$ is the time consumed for calculations in the interrogator and the transponder.

The following approximate values may be valid in a realistic numerical example.

$t_s = 0.16$ ms (2 bytes)

$t_c = 0$ ms n = 1 000

$t_b = 0.01$ ms $t_a = 0.16$ ms (2 bytes)

$t_r = 2.56$ ms (reading 32 bytes)

$t_{k1} = 0$ ms

With the stated values $T_k = 12.88$ ms is obtained. In the case of two transponders with addresses close to each other within the read/write zone the magnitude of the address region needed to be scanned must be determined. In the above example this is the address region $m_j$ to $m_{j+2}$ and accordingly the following amount of time is added to the communication time for information transmission between the transponders and the interrogator:

$$t_a + t_t + t_a + t_r$$

in which $t_t$ is the time the interrogator awaits a reply from the addressed transponder before it transmits a new address. If $t_t$ is 0.25 ms the following addition of time consumed is obtained:

$$0.16 + 0.25 + 0.16 + 2.56 = 3.13 \text{ ms}$$

Accordingly the total time consuming is $12.88 + 3.13 \approx 16$ ms, that is 8 ms for each transponder which is quite acceptable values for the mentioned application fields. It is particularly to be noted that the average time consumed for each transponder or batch decreases when communicating with an increasing number of transponders within the read/write zone.

I claim:

1. A polling-type information transmission system comprising an interrogator and a plurality of transponders, each transponder having a unique address assigned thereto, wherein each transponder comprises:
means for receiving and detecting a start code transmitted by said interrogator when said transponder is within range of the interrogator,
means responsive to detection of said start code for transmitting a reply code after a delay period, said delay period including a delay time which is dependent on the respective address of the transponder, and
means for receiving and transmitting information from and to said interrogator upon receipt of a transmission addressed to said transponder, and
said interrogator comprises:

means for transmitting said start code, means for receiving said reply codes transmitted by any of said transponders which are within range of the interrogator, means for measuring a respective time delay between transmission of said start code and a start of each period of continuous reply code reception, and means, responsive to measurement of said time delay, for identifying the unique address of each respective transponder which is a first transponder which transmitted a reply code which starts a period of reply code reception, characterized in that said interrogator further comprises means for measuring a respective duration of each period of continuous reply code reception, means, responsive to measurement of each said respective duration, for determining respective addresses corresponding to each additional transponder in addition to the respective first transponder whose respective delay period falls within one of said periods of reply code reception, and means for transmitting a respective transmission addressed to each respective first transponder and each respective additional transponder.

2. A system as claimed in claim 1, characterized in that each delay period consists of a same fixed delay plus an integral multiple of a given duration, said integral multiple being a value corresponding to the transponder's unique address.

3. An interrogator for a polling-type information transmission system, for receiving information from a plurality of transponders which each have a unique address assigned thereto and transmit a reply code after a delay period following detection of a start code, said delay period including a delay time which is dependent on the respective address of the transponder, wherein said interrogator comprises:

means for transmitting said start code, means for receiving reply codes transmitted by any of said transponders which are within range of the interrogator, means for measuring a respective time delay between transmission of said start code and a start of each period of continuous reply code reception, and means, responsive to measurement of said time delay, for identifying the unique address of each respective transponder which is a first transponder which transmitted a reply code which starts a period of reply code reception, characterized in that said interrogator further comprises:

means for measuring a respective duration of each period of continuous reply code reception, means, responsive to measurement of each said respective duration, for determining respective addresses corresponding to each additional transponder in addition to the respective first transponder whose respective delay period falls within one of said periods of reply code reception, and means for transmitting a respective transmission addressed to each respective first transponder and each respective additional transponder.

4. An interrogator as claimed in claim 3, characterized in that said means for identifying said unique address comprises means for identifying an integer n which satisfies the equation $$t = t_c + n t_b$$

where t is a measured time delay, $t_c$ is a fixed delay, and $t_b$ is a given duration.

* * * * *